(12) United States Patent
Kubo et al.

(10) Patent No.: US 10,336,181 B2
(45) Date of Patent: Jul. 2, 2019

(54) GRILLE SHUTTER DEVICE

(71) Applicant: TOYOTA JIDOSHA KABUSHIKI KAISHA, Toyota-shi, Aichi-ken (JP)

(72) Inventors: Masaya Kubo, Toyota (JP); Hitoshi Aoyama, Miyoshi (JP); Tatsuya Shimizu, Okazaki (JP); Soichiro Matsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/166,340

(22) Filed: Oct. 22, 2018

(65) Prior Publication Data

US 2019/0160939 A1 May 30, 2019

(30) Foreign Application Priority Data

Nov. 29, 2017 (JP) ................................. 2017-229019

(51) Int. Cl.
*B60K 11/08* (2006.01)
*B62D 35/00* (2006.01)

(52) U.S. Cl.
CPC ............ B60K 11/085 (2013.01); *B62D 35/00* (2013.01)

(58) Field of Classification Search
CPC ........ B60K 11/00; B60K 11/085; B62D 35/00
See application file for complete search history.

(56) References Cited

U.S. PATENT DOCUMENTS

| 4,457,558 A * | 7/1984 | Ishikawa .............. | B60K 11/085 296/180.5 |
|---|---|---|---|
| 5,141,026 A * | 8/1992 | Collette ............... | B60K 11/085 137/601.09 |
| 9,694,858 B2 * | 7/2017 | Wolf ...................... | B62D 37/02 |
| 2011/0232865 A1 * | 9/2011 | Mildner ............... | B60K 11/085 165/98 |
| 2014/0196965 A1 * | 7/2014 | Platto .................... | B60K 11/085 180/68.1 |
| 2015/0239337 A1 * | 8/2015 | Anderson .............. | B60K 11/04 180/68.1 |
| 2015/0246608 A1 * | 9/2015 | Schmidt ................. | B60K 11/04 160/309 |
| 2015/0330288 A1 * | 11/2015 | Nam ..................... | B60K 11/085 165/96 |
| 2018/0347449 A1 * | 12/2018 | Clapie .................. | B60K 11/085 |
| 2019/0009667 A1 * | 1/2019 | Steffen ................. | B60K 11/085 |

FOREIGN PATENT DOCUMENTS

JP 2014-024474 A 2/2014

* cited by examiner

*Primary Examiner* — James A Shriver, II
*Assistant Examiner* — James J Triggs
(74) *Attorney, Agent, or Firm* — Oliff PLC (57) ABSTRACT

A grille shutter device includes a fin unit including slat members inside an opening provided at a part of a decorative side of a vehicle front. The fin unit is configured to selectively assume a closed state and an open state, and the closed state is a state where the slat members are each disposed so as to close the opening in a vehicle front view. The open state is a state where the slat members have been moved from respective positions in the closed state to a vehicle rear side of the opening and arrayed in a row substantially along a vehicle front-rear direction.

10 Claims, 6 Drawing Sheets

GRILLE SHUTTER DEVICE

INCORPORATION BY REFERENCE

The disclosure of Japanese Patent Application No. 2017-229019 filed on Nov. 29, 2017 including the specification, drawings and abstract is incorporated herein by reference in its entirety.

BACKGROUND

1. Technical Field

The present disclosure relates to a grille shutter device.

2. Description of Related Art

Japanese Patent Application Publication No. 2014-24474 (JP 2014-24474 A) discloses a grille shutter device. This grille shutter device has a plurality of openings provided in a vehicle front and opening in a vehicle front-rear direction, a plurality of fins that opens and closes these openings, and a transmission mechanism that moves the fins between an open state and a closed state. Thus, the openings can be closed and opened according to the operation status of a power unit etc., and thereby air can be appropriately taken in.

SUMMARY

However, in the open state of the grille shutter device described in JP 2014-24474 A, the fins have been moved to the rear side in the vehicle front-rear direction of a grid part that is provided between the openings. As a travel wind entering through the openings hits the fins, these fins may create resistance to air inflow, adding to aerodynamic drag.

The present disclosure provides a grille shutter device that can reduce aerodynamic drag.

An aspect of the disclosure provides a grille shutter device including a fin unit including slat members inside an opening provided at a part of a decorative side of a vehicle front, the fin unit being configured to selectively assume a closed state and an open state, the closed state being a state where the slat members are each disposed so as to close the opening in a vehicle front view, the open state being a state where the slat members have been moved from respective positions in the closed state to a vehicle rear side of the opening and arrayed in a row substantially along a vehicle front-rear direction.

In the above aspect, in the closed state, the slat members may be each disposed such that an in-plane direction of each of the slat members follows a plane continuous with the decorative side, and in the open state, the slat members may have been moved from the respective positions in the closed state to a position on the vehicle rear side of the opening and on a vehicle upper side of the opening.

According to the first aspect, the fin unit is provided inside the opening provided at a part of the decorative side of the vehicle front. This fin unit has the slat members, and is configured to selectively assume the closed state of closing the opening and the open state of opening the opening. In the closed state, the opening is closed as the slat members are each disposed such that an in-plane direction of the slat member follows a plane continuous with the decorative side. Here, the "in-plane direction" is a direction following the plane of the slat member and orthogonal to a plate thickness direction of the slat member. On the other hand, in the open state, the opening is opened as the slat members are moved toward the rear side of the opening in the vehicle front-rear direction and the upper side of the opening in the vehicle height direction and arrayed in a row substantially along the vehicle front-rear direction. Thus, in the open state, the slat members are arrayed in a row substantially along the vehicle front-rear direction on the vehicle upper side of the opening, which makes it less likely that air taken in through the opening hits the slat members. As a result, the resistance to air inflow can be reduced.

In the above aspect, the slat members each may move to a position on the vehicle rear side of the opening and on a vehicle upper side of the opening while maintaining substantially the same orientation as in the closed state when the slat members shift from the closed state to the open state.

According to this configuration, the slat members each move toward the rear side of the opening in the vehicle front-rear direction and the upper side of the opening in the vehicle height direction while maintaining substantially the same orientation as in the closed state. Thus, in the open state, the slat members can be disposed so as to be stacked in a row in the vehicle front-rear direction, which can reduce the retraction space of the slat members. Here, the "orientation" may mean a direction normal to the slat member.

In the above aspect, in the open state, a lower end of each of the slat members may be located at substantially the same position as an upper edge of the opening, or a position farther on a vehicle upper side than the upper edge.

According to this configuration, in the open state, the lower end of each slat member is disposed at a position substantially the same as the upper edge of the opening, or farther on the vehicle upper side than the upper edge, in the vehicle height direction. Thus, air taken in through the opening during the open state can be practically prevented from hitting the slat members. As a result, the resistance to air inflow can be further reduced.

In the above aspect, the grille shutter device may include: support members that support and couple to one another the slat members so as to allow the slat members to turn around an axis oriented in a vehicle width direction; and a driving mechanism configured to move the slat members between the open state and the closed state by turning one of the support members substantially in the vehicle front-rear direction.

According to this configuration, the slat members are supported and coupled to one another by the support members so as to be turnable around the axis oriented in the vehicle width direction. Since the slat members are actuated between the open state and the closed state as one of the support members is turned substantially in the vehicle front-rear direction by the driving mechanism, these slat members can be actuated by a small number of driving mechanisms. Thus, the number of components can be kept down.

In the above aspect, the driving mechanism may be configured to turn a support member, among the support members, that supports a slat member, among the slat members, located on a vehicle lower side relative to a slat member located farthest on a vehicle upper side of the slat members, substantially in the vehicle front-rear direction between the open state and the closed state.

According to this configuration, the driving mechanism turns, substantially in the vehicle front-rear direction, the support member supporting one of the slat members that is located on the vehicle lower side in the closed state. Thus, to move the slat members from the closed state to the open state, the slat member having the greatest distance to move of the slat members is actuated by the driving mechanism, which can stabilize the actuation of the fin unit.

In the above aspect, the support members may include upper link members and lower link members, a first upper link member among the upper link members may be rotatably mounted at a part of a first slat member among the slat members on a vehicle upper side, and first lower link member among the lower link members may be rotatably mounted at a part of the first slat member farther on a vehicle lower side than the part at which the first upper link member is mounted on the first slat member, and the first upper link member and the first lower link member may form a four-joint link by being mounted to the first slat member.

According to this configuration, the support members are composed of the upper link members and the lower link members, of which the upper link members are each turnably mounted at the vehicle upper-side part of the corresponding slat member. On the other hand, the lower link members are each turnably mounted at the part of the corresponding slat member farther on the vehicle lower side than the part at which the upper link member is mounted on the slat member. The upper link member and the lower link member form a four-joint link. This allows the slat members to move between the open state and the closed state without changing the orientation. Thus, in the open state, the slat members can be disposed so as to be stacked in a row in the vehicle front-rear direction, which can reduce the retraction space of the slat members.

In the above aspect, each of the support members may have a cutout at a position corresponding to a portion of another of the support members at which one of the slat members is supported.

According to this configuration, the support member has the cutout formed at the position corresponding to the portion of another support member at which the slat member is supported. Thus, interference between the support members can be avoided, and the slat members can be moved until substantially flush in the closed state.

In the above aspect, the grille shutter device may include a frame that is installed on the vehicle rear side of the opening, and the fin unit may be provided inside the frame.

In the above aspect, each of the slat members may have a rectangular plate shape with a plate thickness direction oriented in the vehicle front-rear direction and a longitudinal direction oriented in a vehicle width direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A grille shutter device 10 according to an embodiment of the present disclosure will be described below based on FIG. 1 to FIG. 6. The arrows FR, UP, and OUT shown as necessary in the drawings respectively indicate a forward direction (advancing direction) and an upward direction of a vehicle and a direction toward an outer side in a vehicle width direction. Unless otherwise specified, directions used in the following description referred to simply as front and rear sides, left and right sides, and upper and lower sides respectively mean front and rear sides in a vehicle front-rear direction, left and right sides in a vehicle left-right direction (vehicle width direction), and upper and lower sides in a vehicle height direction.

Overall Configuration

Figure 1:
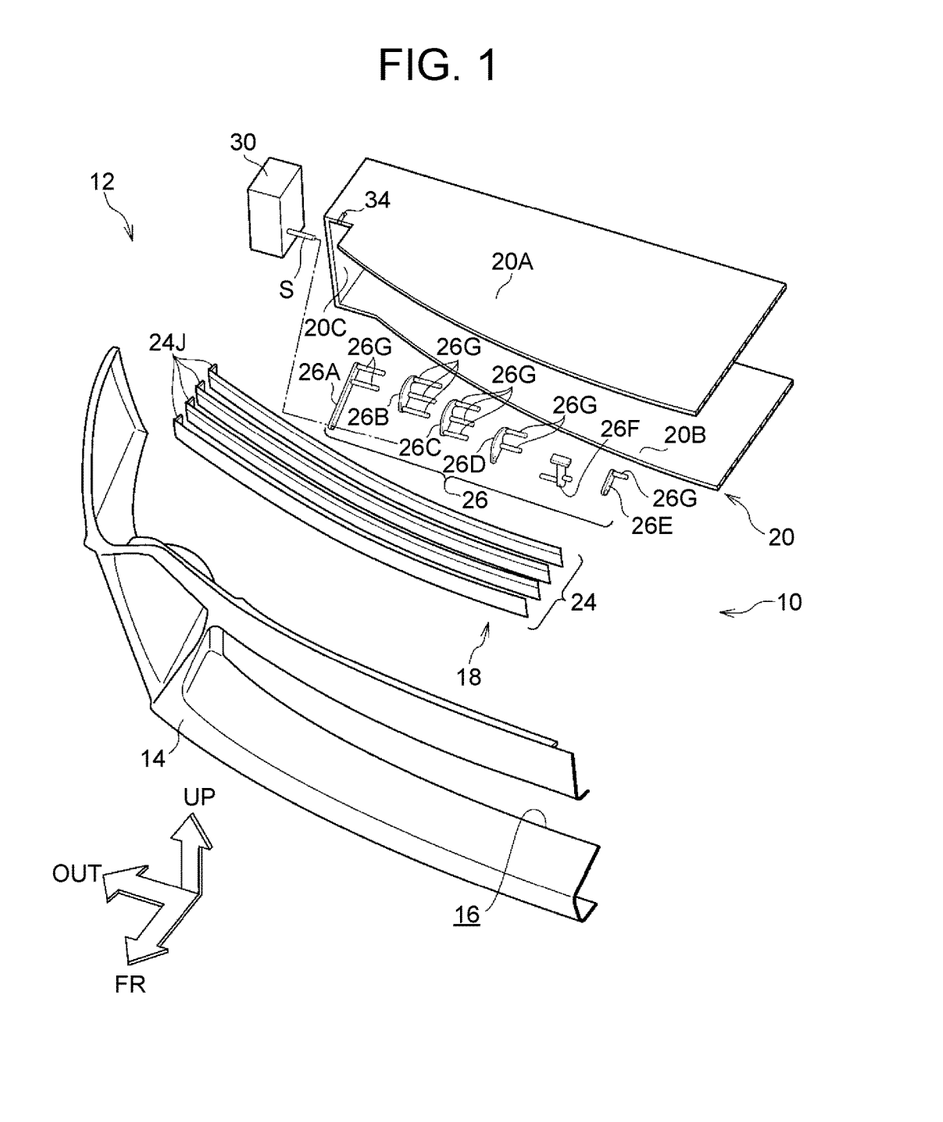
FIG. 1 is an exploded perspective view showing a grille shutter device according to an embodiment.

As shown in FIG. 1, a front bumper cover 14 is provided in a front of a vehicle 12. The front bumper cover 14 constitutes a part of an external decorative side of a vehicle body, and covers a front bumper absorber and a front bumper reinforcement (neither is shown) from the vehicle front side. For example, the front bumper cover 14 is made of resin and has a thin form.

The grille shutter device 10 is provided on the vehicle lower side of the front bumper cover 14. The grille shutter device 10 has an opening 16, a fin unit 18, and a frame 20.

The opening 16 is formed in the front bumper cover 14 and opens in the vehicle front-rear direction. The opening 16 extends in the vehicle width direction, and specifically has a substantially rectangular shape with a longitudinal direction oriented in the vehicle width direction as seen in a front view. The opening 16 is disposed such that the center thereof in the vehicle width direction coincides with the center of the front bumper cover 14 in the vehicle width direction.

Frame

The frame 20 is installed on the vehicle rear side of the opening 16. The frame 20 has an upper wall 20A provided on the vehicle upper side, a lower wall 20B provided on the vehicle lower side, and a pair of side walls 20C provided respectively on the outer sides in the vehicle width direction (in FIG. 1, only the side wall 20C on one side is shown). The upper wall 20A has a substantially rectangular plate shape with a plate thickness direction oriented in the vehicle height direction and a longitudinal direction oriented in the vehicle width direction.

Like the upper wall 20A, the lower wall 20B has a substantially rectangular plate shape with a plate thickness direction oriented in the vehicle height direction and a longitudinal direction oriented in the vehicle width direction. Thus, the upper wall 20A and the lower wall 20B are provided opposite to each other in the vehicle height direction.

The side wall 20C has a substantially rectangular plate shape with a plate thickness direction oriented in the vehicle width direction and a longitudinal direction oriented in the vehicle height direction. The side wall 20C is provided so as to couple together an end of the upper wall 20A on the outer side in the vehicle width direction and an end of the lower wall 20B on the outer side in the vehicle width direction. Thus, the frame 20 has a shape of a rectangular frame opening in the vehicle front-rear direction. The size of the frame 20 is set to be larger than the size of the opening 16 in the vehicle width direction and the vehicle height direction.

Fin Unit

The fin unit 18 is provided inside the frame 20. The fin unit 18 has a plurality of slat members 24 and a plurality of pairs of left and right support members 26. In the following, each part will be described in detail.

Slat Member

The slat member 24 has a substantially rectangular plate shape with a plate thickness direction oriented in the vehicle front-rear direction and a longitudinal direction oriented in the vehicle width direction, and a slat side wall 24J rising in the plate thickness direction of the slat member 24 is provided at each end of the slat member 24 in the vehicle width direction. The slat member 24 is curved such that, in a closed state of closing the opening 16 shown in FIG. 4, a substantially central part of the slat member 24 in the vehicle width direction protrudes toward the vehicle front side so as to follow the decorative side of the front bumper cover 14 as seen in a vehicle plan view. In this embodiment, for example, four slat members 24 having the above configuration are provided.

Figure 4:
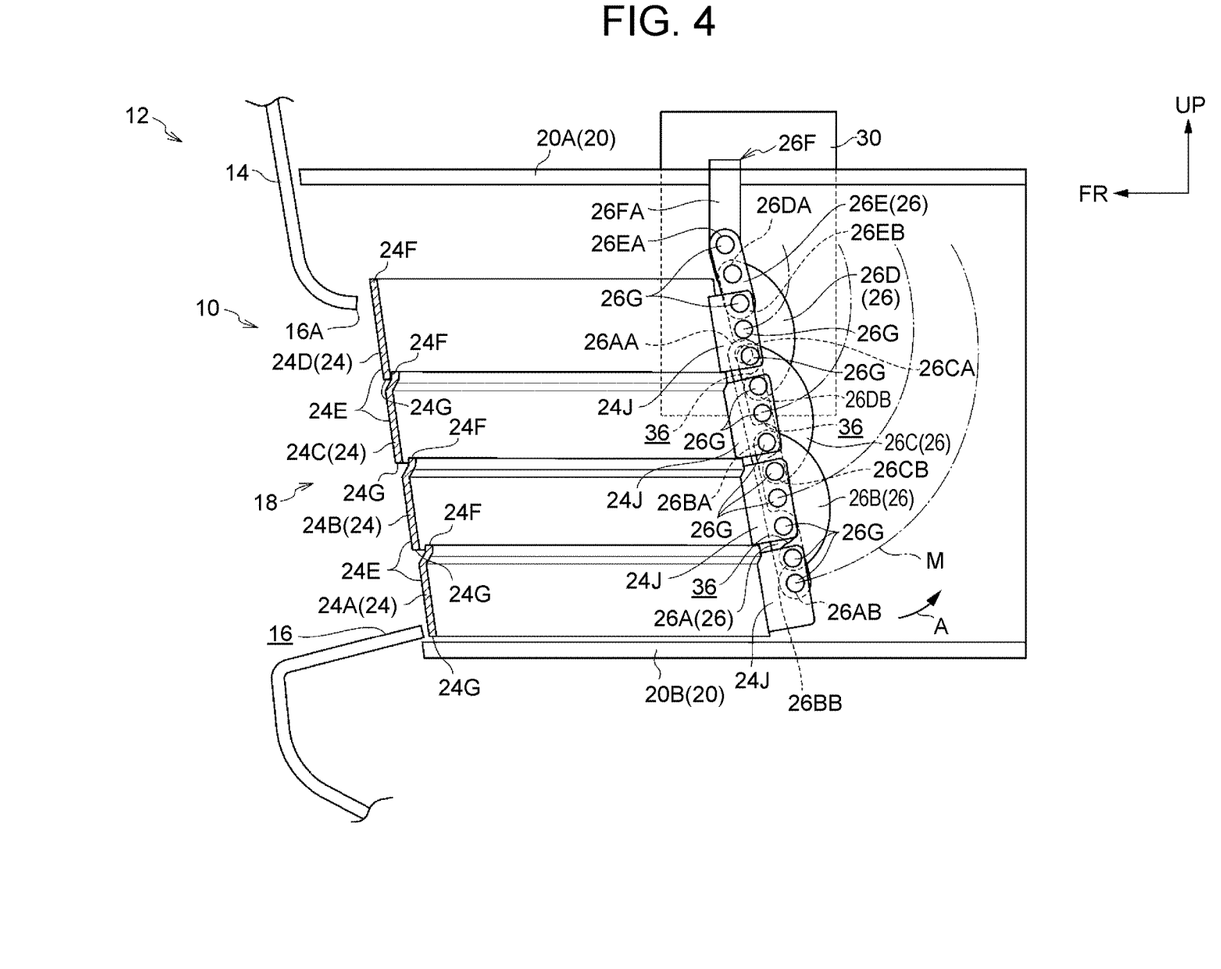
FIG. 4 is a side view showing the closed state of the grille shutter device according to the embodiment.

As shown in FIG. 4, in the closed state, the slat members 24 are arrayed substantially in the vehicle height direction so as to close the opening 16 (hereinafter, the slat members 24 will be referred to as a "first slat member 24A," "second slat member 24B," "third slat member 24C," and "fourth slat member 24D" in the order of disposition from the vehicle lower side toward the vehicle upper side). Thus, a direction normal to each slat member 24 (the orientation thereof) is the vehicle front-rear direction. A side surface 24E of each slat member 24 on the vehicle front side is formed such that an in-plane direction of the side surface 24E follows a plane continuous with the decorative side of the front bumper cover 14 in a state where the slat members 24 are arrayed substantially in the vehicle height direction. In other words, in the state where the slat members 24 are arrayed substantially in the vehicle height direction, the side surfaces 24E and the front bumper cover 14 constitute the external decorative side of the vehicle.

Upper ends 24F of the slat members 24 except for the fourth slat member 24D are bent such that in the closed state the upper end 24F of one slat member 24 faces, in the vehicle front-rear direction, a lower end 24G of another slat member 24 disposed on the vehicle upper side of this slat member 24. Thus, as shown in FIG. 2, no clearance is left between the slat members 24 in the closed state as seen in a vehicle front view.

Support Member

Figure 6:
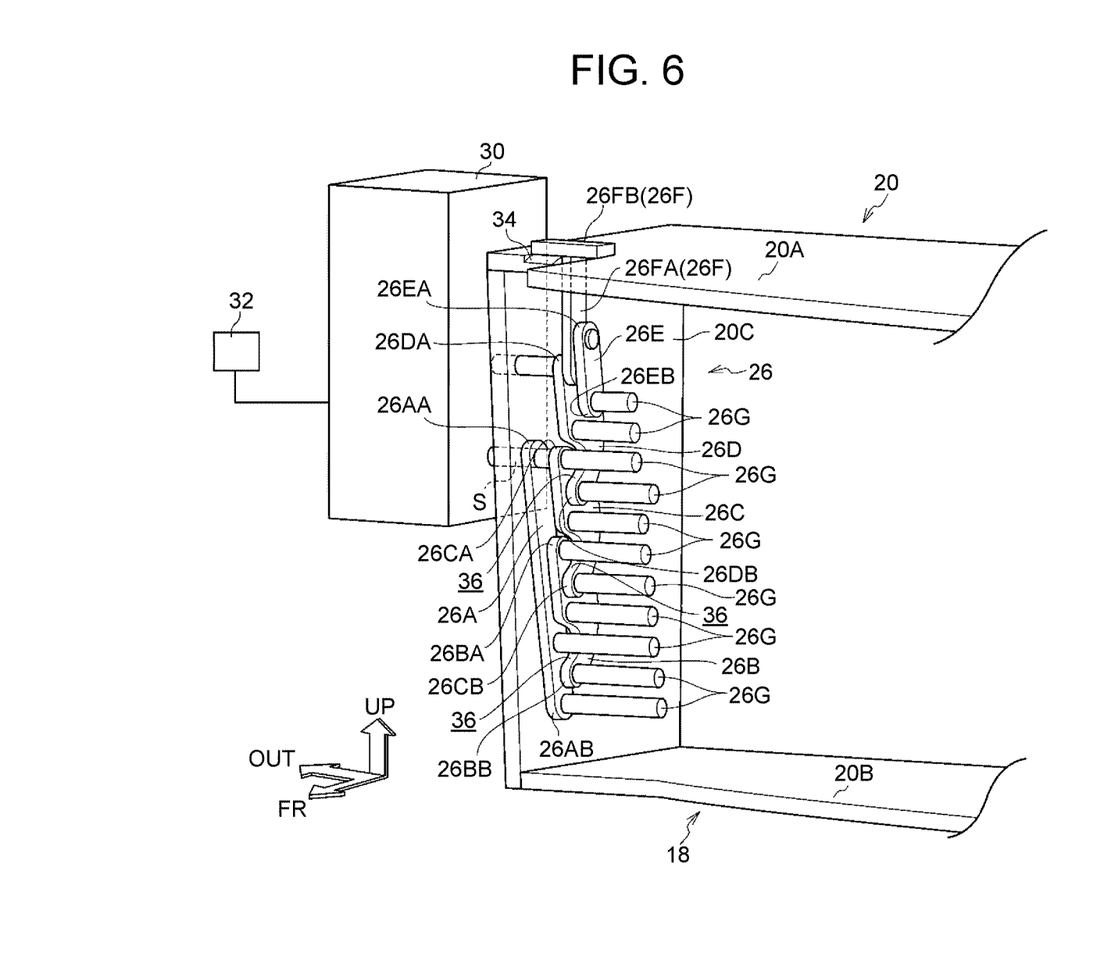
FIG. 6 is a perspective view showing support members of the grille shutter device according to the embodiment.

As shown in FIG. 6, the support members 26 include a first support member 26A, second support member 26B, third support member 26C, fourth support member 26D, fifth support member 26E, and upper wall support member 26F. The first support member 26A has a substantially rectangular plate shape with a plate thickness direction oriented in the vehicle width direction, and with a longitudinal direction oriented substantially in a vehicle up-down direction in the closed state. One end 26AA of the first support member 26A in the longitudinal direction is fixed to a turning shaft S of an actuator 30 serving as a driving mechanism to be described later. The turning shaft S can turn around an axis oriented in the vehicle width direction. Slat support columns 26G as portions supporting the slat member 24 (see FIG. 4) are provided at the other end 26AB of the first support member 26A in the longitudinal direction. The slat support column 26G has a shape of a circular column having an axial direction oriented in the vehicle width direction and protruding toward the inner side in the vehicle width direction, and the pair of slat support columns 26G is provided apart from each other in the longitudinal direction of the first support member 26A.

Figure 2:
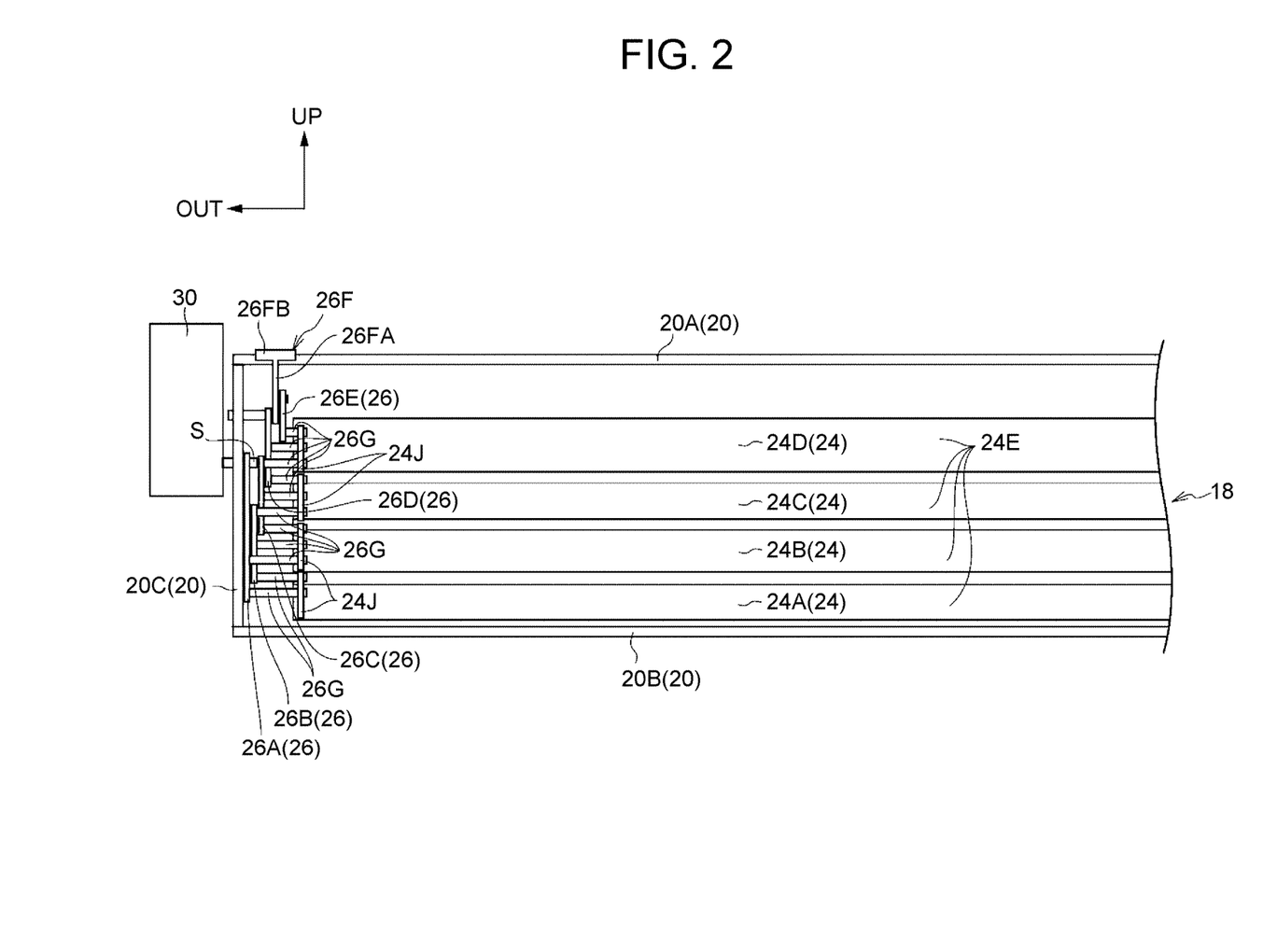
FIG. 2 is a front view showing a closed state of the grille shutter device according to the embodiment.

The second support member 26B is provided on the inner side of the first support member 26A in the vehicle width direction (see also FIG. 2). The second support member 26B has a substantially semi-circular plate shape with a plate thickness direction oriented in the vehicle width direction, and with an arc-shaped part oriented substantially toward the vehicle rear side in the closed state. As with the first support member 26A, a slat support column 26G is provided at each of ends 26BA, 26BB of the second support member 26B in a longitudinal direction. Another slat support column 26G is provided at a substantially middle part of the second support member 26B in the longitudinal direction. In the closed state, the end 26BB of the second support member 26B is disposed farther on the vehicle upper side than the end 26AB of the first support member 26A but farther on the vehicle lower side than the slat support column 26G of the first support member 26A located closer to the end 26AA.

In the closed state, the slat support columns 26G provided in the second support member 26B are disposed substantially along the longitudinal direction of the first support member 26A as seen in a vehicle side view (see FIG. 4). A cutout 36 formed by cutting out the second support member 26B substantially toward the vehicle rear side is formed at a portion of the second support member 26B corresponding to the slat support column 26G of the first support member 26A located closer to the end 26AA. Thus, interference between the second support member 26B and the slat support column 26G of the first support member 26A in the closed state is avoided.

The third support member 26C is provided on the inner side of the second support member 26B in the vehicle width direction (see also FIG. 2). The third support member 26C has a substantially semi-circular plate shape with a plate thickness direction oriented in the vehicle width direction, and with an arc-shaped part oriented substantially toward the vehicle rear side in the closed state. As with the first support member 26A, a slat support column 26G is provided at each of ends 26CA, 26CB of the third support member 26C in a longitudinal direction. Another slat support column 26G is provided at a substantially middle part of the third support member 26C in the longitudinal direction. In the closed state, the end 26CB of the third support member 26C is disposed farther on the vehicle upper side than the slat support column 26G at the substantially middle part of the second support member 26B in the longitudinal direction but farther on the vehicle lower side than the end 26BA of the second support member 26B.

As with the second slat member 24B, in the closed state, the slat support columns 26G provided in the third support member 26C are disposed substantially along the longitudinal direction of the first support member 26A as seen in a vehicle side view (see FIG. 4). A cutout 36 formed by cutting out the third support member 26C substantially toward the vehicle rear side is formed at a portion of the third support member 26C corresponding to the slat support column 26G at the end 26BA of the second support member 26B. Thus, interference between the third support member 26C and the slat support column 26G of the second support member 26B in the closed state is avoided.

The fourth support member 26D is provided on the inner side of the third support member 26C in the vehicle width direction (see also FIG. 2). The fourth support member 26D has a substantially semi-circular plate shape with a plate thickness direction oriented in the vehicle width direction, and with an arc-shaped part oriented substantially toward the vehicle rear side in the closed state. One end 26DA of the fourth support member 26D in a longitudinal direction is turnably supported on the side wall 20C. On the other hand, as with the first support member 26A, a slat support column 26G is provided at the other end 26DB of the fourth support member 26D in the longitudinal direction. Another slat support column 26G is provided at a substantially middle part of the fourth support member 26D in the longitudinal direction. The one end 26DA of the fourth support member 26D is disposed farther on the vehicle upper side than the turning shaft S of the actuator 30. In the closed state, the other end 26DB of the fourth support member 26D is disposed farther on the vehicle upper side than the slat support column 26G at the substantially middle part of the third support member 26C in the longitudinal direction but farther on the vehicle lower side than the end 26CA of the third support member 26C.

As with the second slat member 24B, in the closed state, the slat support columns 26G provided in the fourth support member 26D are disposed substantially along the longitudinal direction of the first support member 26A as seen in a vehicle side view (see FIG. 4). A cutout 36 formed by cutting out the fourth support member 26D substantially toward the vehicle rear side is formed at a portion of the fourth support member 26D corresponding to the slat support column 26G at the end 26CA of the third support member 26C. Thus, interference between the fourth support member 26D and the slat support column 26G of the third support member 26C in the closed state is avoided.

The upper wall support member 26F is provided on the inner side of the fourth support member 26D in the vehicle width direction (see also FIG. 2). The upper wall support member 26F has a support main body 26FA and a mounting base 26FB. The support main body 26FA has a substantially rectangular plate shape with a plate thickness direction oriented in the vehicle width direction and a longitudinal direction oriented substantially in the vehicle height direction. The mounting base 26FB is provided at an upper end of the support main body 26FA, and has a substantially rectangular plate shape with a plate thickness direction oriented substantially in the vehicle height direction, and with a longitudinal direction oriented in the vehicle width direction as seen in a vehicle plan view. The upper wall support member 26F is mounted on the upper wall 20A of the frame 20 in a state where a lower surface of the mounting base 26FB is on an upper side of a mounting cutout 34 that is formed in the upper wall 20A. Thus, the support main body 26FA extends toward the vehicle lower side. A lower end of the support main body 26FA is disposed at substantially the same position as the end 26DA of the fourth support member 26D as seen in a vehicle side view.

The fifth support member 26E is provided on the inner side of the support main body 26FA in the vehicle width direction (see also FIG. 2). The fifth support member 26E has a substantially rectangular plate shape with a plate thickness direction oriented in the vehicle width direction, and with a longitudinal direction oriented substantially in the vehicle height direction in the closed state. One end 26EA of the fifth support member 26E in the longitudinal direction is turnably supported on the support main body 26FA of the upper wall support member 26F. On the other hand, as with the first support member 26A, a slat support column 26G is provided at the other end 26EB of the fifth support member 26E in the longitudinal direction. In the closed state, the end 26EB of the fifth support member 26E is disposed farther on the vehicle upper side than the slat support column 26G at the substantially middle part of the fourth support member 26D in the longitudinal direction.

Relationships Between Slat Members and Support Members

In the closed state as shown in FIG. 4, the slat support column 26G at the end 26AB of the first support member 26A and the slat support column 26G at the end 26BB of the second support member 26B are each turnably mounted on the slat side wall 24J of the first slat member 24A in this order from the vehicle lower side. Here, in the first slat member 24A, the second support member 26B turnably mounted at a vehicle upper-side part of the slat side wall 24J may be regarded as a "upper link member", and the first support member 26A turnably mounted at a part of the slat side wall 24J farther on the vehicle lower side than the part (the slat support column 26G) at which the second support member 26B is mounted on the slat side wall 24J may be regarded as a "lower link member". A four-joint link is formed as the first support member 26A and the second support member 26B are coupled to the first slat member 24A. The slat support column 26G at the end 26AB of the first support member 26A is mounted at a substantially central part in the vehicle height direction of the slat side wall 24J of the first slat member 24A in the closed state. The slat support column 26G at the end 26BB of the second support member 26B is mounted at a vehicle upper-side part of the slat side wall 24J of the first slat member 24A in the closed state.

In the closed state, the slat support column 26G of the first support member 26A located closer to the end 26AA, the slat support column 26G at the substantially middle part of the second support member 26B in the longitudinal direction, and the slat support column 26G at the end 26CB of the third support member 26C are each turnably mounted on the slat side wall 24J of the second slat member 24B in this order from the vehicle lower side. Here, in the second slat member 24B, the third support member 26C turnably mounted at a vehicle upper-side part of the slat side wall 24J may be regarded as a "upper link member", and the second support member 26B turnably mounted at a part of the slat side wall 24J farther on the vehicle lower side than the part (slat support column 26G) at which the third support member 26C is mounted on the slat side wall 24J may be regarded as a "lower link member". A four-joint link is formed as the second support member 26B and the third support member 26C are coupled to the second slat member 24B.

In the closed state, the slat support column 26G at the end 26BA of the second support member 26B, the slat support column 26G at the substantially middle part of the third support member 26C in the longitudinal direction, and the slat support column 26G at the end 26DB of the fourth support member 26D are each turnably mounted on the slat side wall 24J of the third slat member 24C in this order from the vehicle lower side. Here, in the third slat member 24C, the fourth support member 26D turnably mounted at a vehicle upper-side part of the slat side wall 24J may be regarded as a "upper link member", and the third support member 26C turnably mounted at a part of the slat side wall 24J farther on the vehicle lower side than the part (slat support column 26G) at which the fourth support member 26D is mounted on the slat side wall 24J may be regarded as a "lower link member". A four-joint link is formed as the third support member 26C and the fourth support member 26D are coupled to the third slat member 24C.

In the closed state, the slat support column 26G at the end 26CA of the third support member 26C, the slat support column 26G at the substantially middle part of the fourth support member 26D in the longitudinal direction, and the slat support column 26G at the end 26EB of the fifth support member 26E are each turnably mounted on the slat side wall 24J of the fourth slat member 24D in this order from the vehicle lower side. Here, in the fourth slat member 24D, the fifth support member 26E turnably mounted at a vehicle upper-side part of the slat side wall 24J may be regarded as a "upper link member", and the fourth support member 26D turnably mounted at a part of the slat side wall 24J farther on the vehicle lower side than the part (slat support column 26G) at which the fifth support member 26E is mounted on the slat side wall 24J may be regarded as a "lower link member". A four-joint link is formed as the fourth support member 26D and the fifth support member 26E are coupled to the fourth slat member 24D.

Actuator

The actuator 30 is provided on the outer side of the side wall 20C of the frame 20 in the vehicle width direction. As shown in FIG. 6, the actuator 30 has the turning shaft S that can turn around the axis oriented in the vehicle width direction, and is electrically connected to a controller 32. The controller 32 is composed mainly of a computer including publicly known CPU, ROM, RAM (none is shown), etc. A sensor detecting the temperature of a coolant of a power unit and a vehicle speed sensor (neither is shown) are connected to an input side of the controller 32. The actuator 30 is connected to an output side of the controller 32.

Workings and Effects

Next, the workings and effects of the embodiment will be described.

In the embodiment, when the fin unit 18 is in the closed state as shown in FIG. 4 and the controller 32 determines to switch the fin unit 18 to the open state of opening the opening 16 based on the temperature of the coolant of the power unit etc., an actuation signal that causes the turning shaft S to turn is sent from the controller 32 to the actuator 30. In this case, the turning shaft S is turned in a direction in which the end 26AB of the first support member 26A moves toward the vehicle rear side and the vehicle upper side (arrow A). As a result, the first slat member 24A that is turnably mounted at the end 26AB of the first support member 26A moves toward the vehicle rear side and the vehicle upper side while drawing a movement trajectory M. Following the first slat member 24A, the second slat member 24B, the third slat member 24C, and the fourth slat member 24D that are coupled by the first support member 26A, the second support member 26B, the third support member 26C, and the fourth support member 26D also move toward the vehicle rear side and the vehicle upper side. In this case, since the slat members 24 are supported so as to form four-joint links by the support members 26, the slat members 24 move toward the vehicle rear side and the vehicle upper side while maintaining the same orientation as in the closed state.

Figure 5:
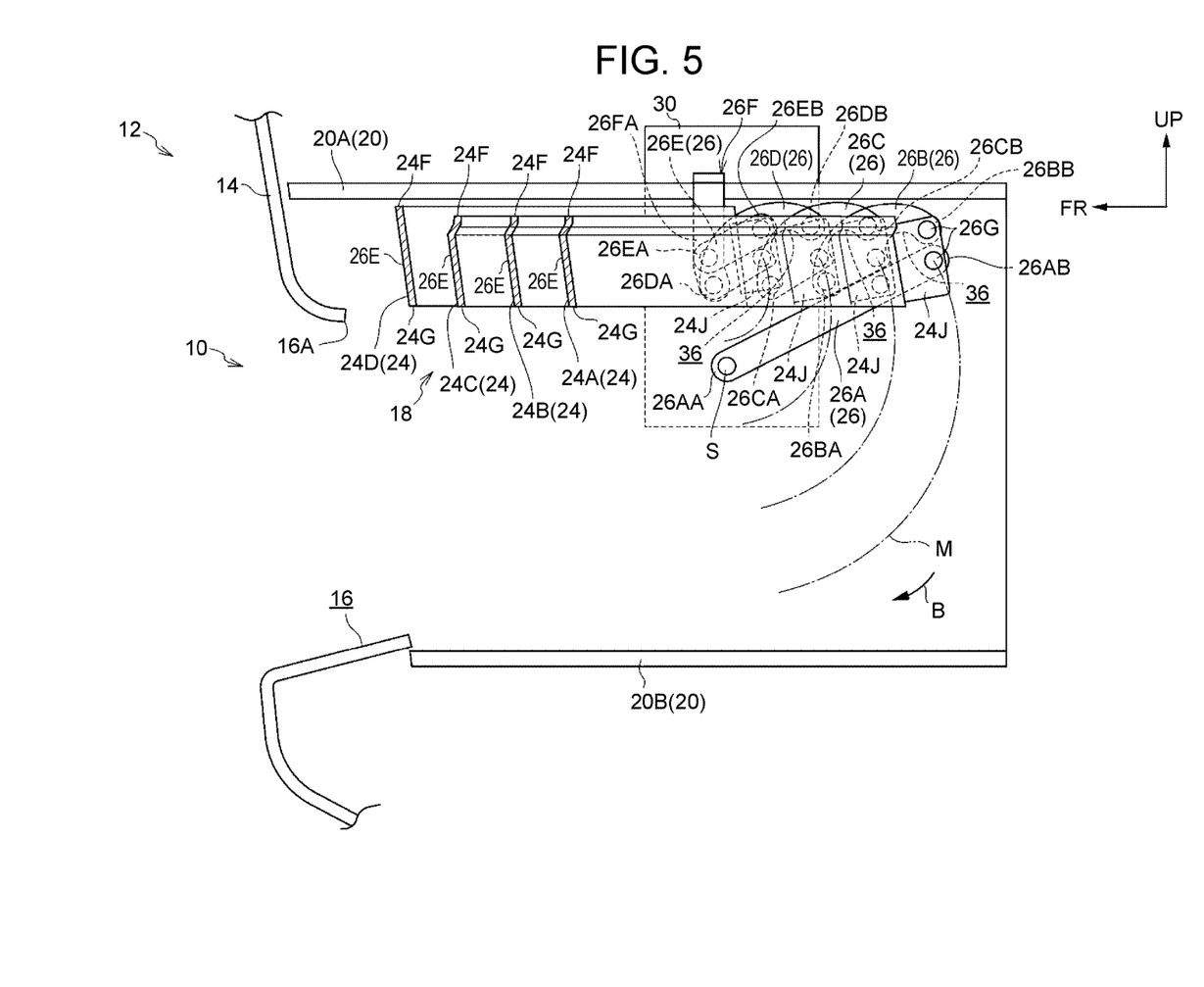
FIG. 5 is a side view showing the open state of the grille shutter device according to the embodiment.

As shown in FIG. 5, when the slat members 24 have moved to reach the state of being arrayed in a row substantially along the vehicle front-rear direction so as to be stacked in the normal direction, any further movement of the slat members 24 is restricted, for example, as the first support member 26A hits a stopper rib (not shown) provided in the frame 20. In this state, the lower ends 24G of the slat members 24 are disposed farther on the vehicle upper side than the upper edge 16A of the opening 16. Conversely, to switch the fin unit 18 to the closed state, the turning shaft S of the actuator 30 is turned in the reverse direction from the above direction. As a result, the end 26AB of the first support member 26A moves in a direction toward the vehicle lower side and the vehicle front side (arrow B), and thereby the slat members 24 can be moved toward the vehicle lower side and the vehicle front side to reach the closed state.

Figure 3:
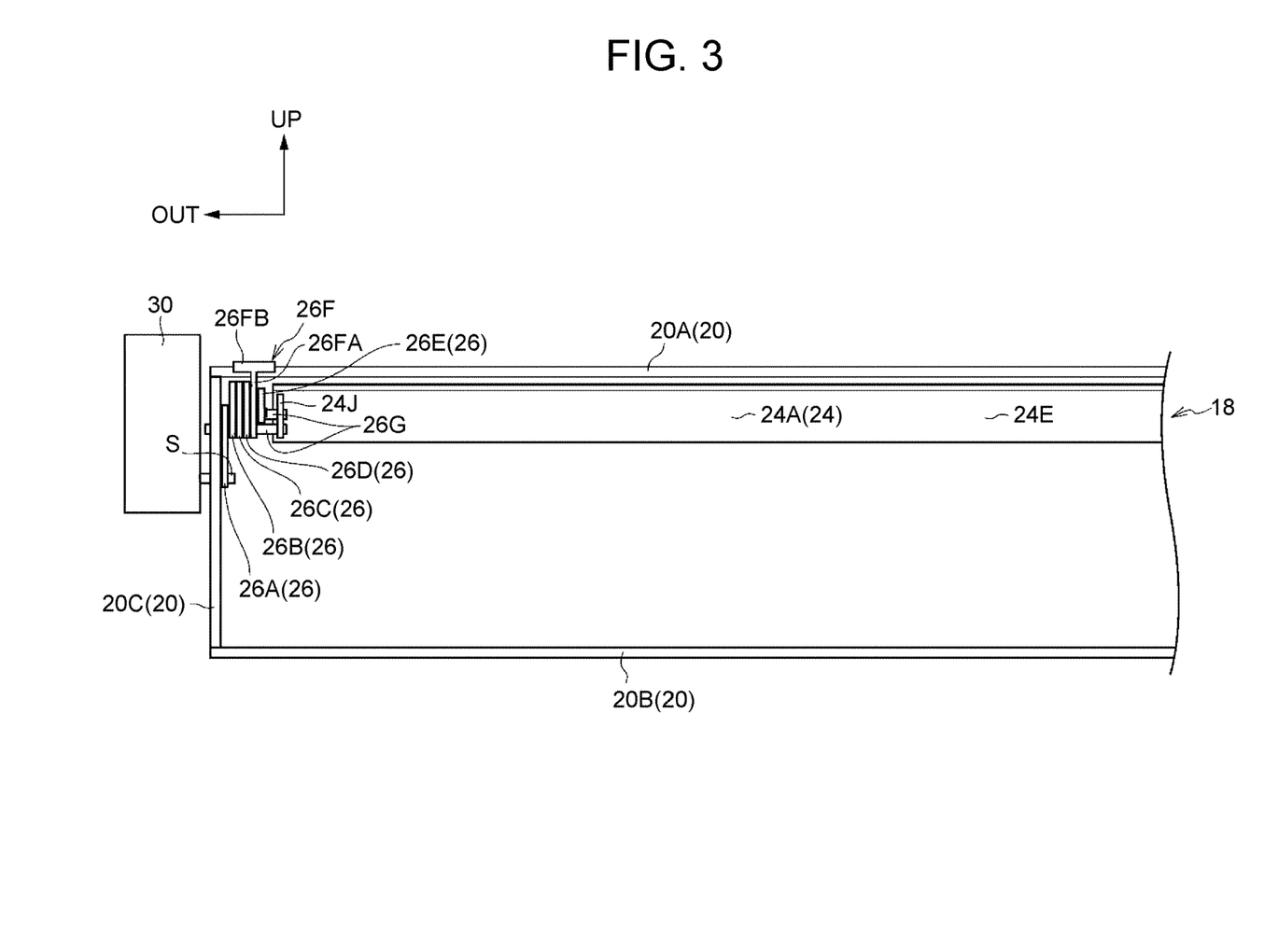
FIG. 3 is a front view showing an open state of the grille shutter device according to the embodiment.

As has been described above, the fin unit 18 is provided inside the opening 16 provided at a part of the decorative side of the vehicle front as shown in FIG. 4. The fin unit 18 has the slat members 24, and is configured to selectively assume the closed state of closing the opening 16 and the open state of opening the opening 16. In the closed state, the opening 16 is closed as the slat members 24 are each disposed such that the in-plane direction of the slat member 24 follows a plane continuous with the decorative side. On the other hand, in the open state, the opening 16 is opened as shown in FIG. 3 and FIG. 5 as the slat members 24 are each moved toward the vehicle rear side and the vehicle upper side of the opening 16 and arrayed in a row substantially along the vehicle front-rear direction, while the same orientation of the slat members 24 as in the closed state is maintained. Thus, in the open state, the slat members 24 are arrayed in a row substantially along the vehicle front-rear direction on the vehicle upper side of the opening 16, which makes it less likely that air taken in through the opening 16 hits the slat members 24. Thus, the resistance to air inflow can be reduced. As a result, the aerodynamic drag can be reduced.

Since the lower end 24G of each slat member 24 is disposed farther on the vehicle upper side than the upper edge 16A of the opening 16 in the open state, air taken in through the opening 16 during the open state can be practically prevented from hitting the slat members 24. Thus, the resistance to air inflow can be further reduced. As a result, the aerodynamic drag can be further reduced.

The slat members 24 are supported and coupled to one another by the support members 26 so as to be turnable around an axis oriented in the vehicle width direction. Since the slat members 24 are actuated between the open state and the closed state as the first support member 26A of the support members 26 is turned substantially in the vehicle front-rear direction by the actuator 30, the slat members 24 can be actuated by a small number of actuators 30. Thus, the number of components can be kept down. As a result, the cost can be reduced.

The actuator 30 turns, substantially in the vehicle front-rear direction, the first support member 26A supporting the first slat member 24A of the slat members 24 that is disposed on the vehicle lower side in the closed state. Thus, to move the slat members 24 from the closed state to the open state, the first slat member 24A having the greatest distance to move of the slat members 24 is actuated by the actuator 30, which can stabilize the actuation of the fin unit 18. As a result, the reliability of the device can be improved.

The support members 26 include the upper link members and the lower link members, of which the upper link members are each turnably mounted at the vehicle upper-side part of the corresponding slat member 24. On the other hand, the lower link members are each turnably mounted at the part of the corresponding slat member 24 farther on the vehicle lower side than the part at which the upper link member is mounted on the slat member 24. A four-joint link is formed by the upper link member and the lower link member. This allows the slat members 24 to move between the open state and the closed state without changing the orientation. Thus, the slat members 24 can be disposed so as to be stacked in a row in the vehicle front-rear direction in the open state, which can reduce the retraction space of the slat members 24. As a result, the device can be downsized. Moreover, the four-joint links allow the slat members 24 to be disposed so as to be flush with substantially the same orientation in the closed state, which can enhance the decorative quality.

The support member 26 has the cutout 36 formed at the position corresponding to the slat support column 26G of another support member 26 at which the slat member 24 is supported. Thus, interference between the support members 26 can be avoided, and the slat members 24 can be moved until substantially flush in the closed state. As a result, the aerodynamic performance in the closed state can be improved.

Of the support members 26, the second support member 26B, the third support member 26C, and the fourth support member 26D that have the cutout 36 formed therein have a substantially semi-circular plate shape as shown in FIG. 4, which can suppress a decrease in bending rigidity resulting from the formation of the cutout 36.

In the embodiment, four slat members 24 are provided. However, the present disclosure is not limited to this example, and the number of the slat members 24 may be three or smaller or five or larger.

The actuator 30 is configured to turn only the first support member 26A, but the present disclosure is not limited to this example. The actuator 30 may be configured to turn a plurality of support members 26 among the second support member 26B, the third support member 26C, the fourth support member 26D, the fifth support member 26E, etc. Alternatively, the actuator 30 may be configured to turn only one support member 26 other than the first support member 26A, or a plurality of actuators 30 may be provided to turn a plurality of support members 26.

The lower ends 24G of the slat members 24 are disposed farther on the vehicle upper side than the upper edge 16A of the opening 16 in the open state. However, the present disclosure is not limited to this example, and the lower ends 24G may be disposed farther on the vehicle lower side than the upper edge 16A of the opening 16.

The cutout 36 is formed in the second support member 26B, the third support member 26C, and the fourth support member 26D. However, the present disclosure is not limited to this example, and the cutout 36 may be omitted. The cutout 36 may be provided in the first support member 26A and the fifth support member 26E.

The lower end 24G of each slat member 24 is disposed farther on the vehicle upper side than the upper edge 16A of the opening 16 in the open state. However, the present disclosure is not limited to this example, and the lower end 24G may be disposed at substantially the same position as the upper edge 16A in the vehicle height direction in the open state.

The slat members 24 are configured to be disposed in a row substantially along the vehicle front-rear direction in the open state, and this configuration may include a configuration in which the slat members 24 are disposed in a row along a direction inclined from the vehicle front-rear direction toward the vehicle height direction or the vehicle width direction.

The slat members 24 are disposed with the side surfaces 24E of the slat members oriented in the vehicle front-rear direction in the open state. However, the present disclosure is not limited to this example, and the slat members 24 may be disposed with the side surfaces 24E oriented in the vehicle up-down direction.

What is claimed is:

1. A grille shutter device comprising a fin unit including slat members inside an opening provided at a part of a decorative side of a vehicle front, the fin unit being configured to selectively assume a closed state and an open state, the closed state being a state where the slat members are each disposed so as to close the opening in a vehicle front view, the open state being a state where the slat members have been moved from respective positions in the closed state to a vehicle rear side of the opening and arrayed in a row substantially along a vehicle front-rear direction.

2. The grille shutter device according to claim 1, wherein the slat members each move to a position on the vehicle rear side of the opening and on a vehicle upper side of the opening while maintaining substantially the same orientation as in the closed state when the slat members shift from the closed state to the open state.

3. The grille shutter device according to claim 1, wherein in the open state, a lower end of each of the slat members is located at substantially the same position as an upper edge of the opening, or a position farther on a vehicle upper side than the upper edge.

4. The grille shutter device according to claim 1, further comprising:
   support members that support and couple to one another the slat members so as to allow the slat members to turn around an axis oriented in a vehicle width direction; and
   a driving mechanism configured to move the slat members between the open state and the closed state by turning one of the support members substantially in the vehicle front-rear direction.

5. The grille shutter device according to claim 4, wherein the driving mechanism is configured to turn a support member, among the support members, that supports a slat member, among the slat members, located on a vehicle lower side relative to a slat member located farthest on a vehicle upper side of the slat members, substantially in the vehicle front-rear direction between the open state and the closed state.

6. The grille shutter device according to claim 4, wherein the support members include upper link members and lower link members, a first upper link member among the upper link members is rotatably mounted at a part of a first slat member among the slat members on a vehicle upper side, and first lower link member among the lower link members is rotatably mounted at a part of the first slat member farther on a vehicle lower side than the part at which the first upper link member is mounted on the first slat member, and
   the first upper link member and the first lower link member form a four-joint link by being mounted to the first slat member.

7. The grille shutter device according to claim 4, wherein each of the support members has a cutout at a position corresponding to a portion of another of the support members at which one of the slat members is supported.

8. The grille shutter device according to claim 1, further comprising
   a frame that is installed on the vehicle rear side of the opening wherein
   the fin unit is provided inside the frame.

9. The grille shutter device according to claim 1, wherein each of the slat members has a rectangular plate shape with a plate thickness direction oriented in the vehicle front-rear direction and a longitudinal direction oriented in a vehicle width direction.

10. The grille shutter device according to claim 1, wherein in the closed state, the slat members are each disposed such that an in-plane direction of each of the slat members follows a plane continuous with the decorative side, and in the open state, the slat members have been moved from the respective positions in the closed state to a position on the vehicle rear side of the opening and on a vehicle upper side of the opening.

* * * * *